Nov. 8, 1949     F. H. SHARP ET AL     2,487,076
PROCESS FOR PRODUCING ALUMINA
Filed Dec. 2, 1944
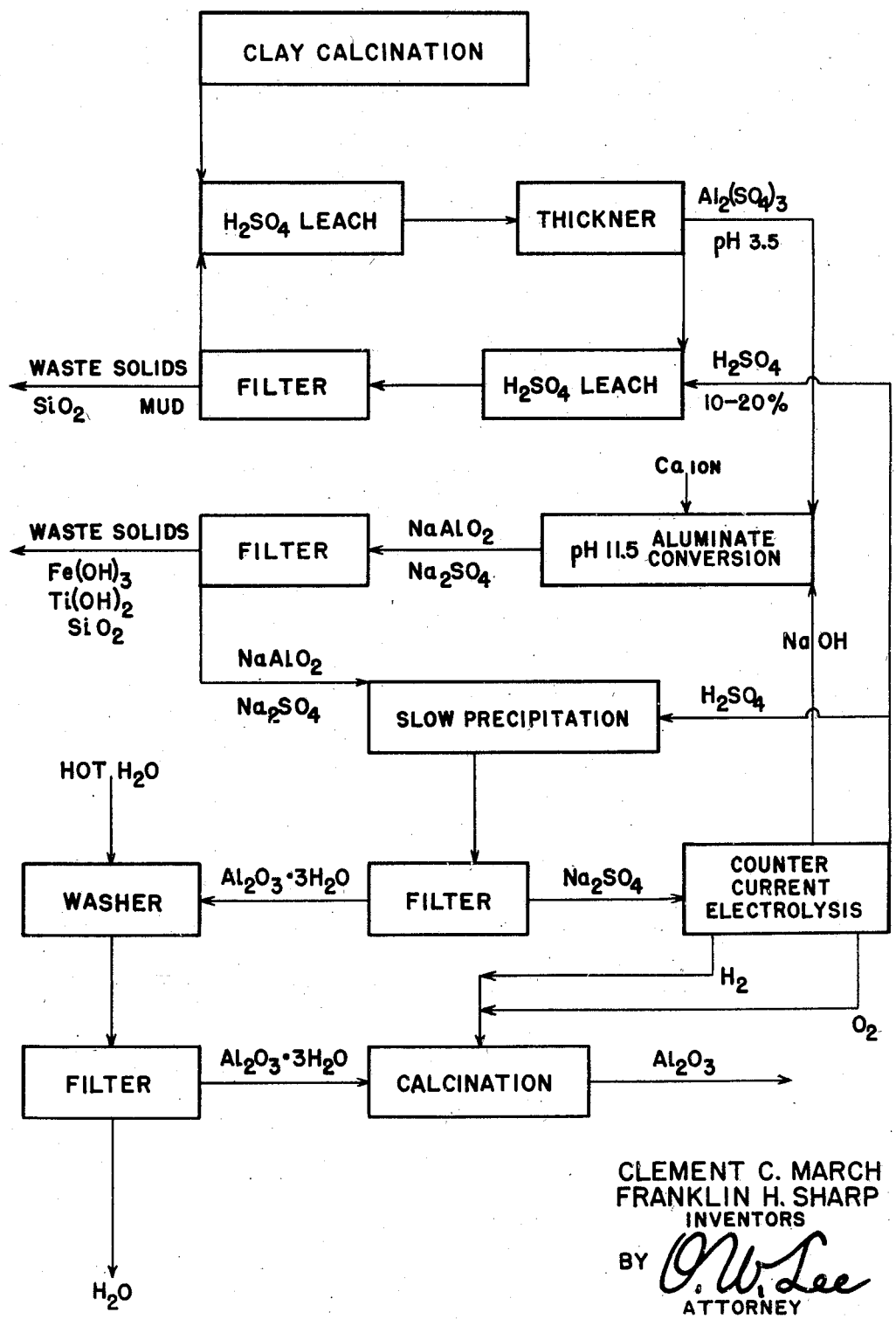
CLEMENT C. MARCH
FRANKLIN H. SHARP
INVENTORS Patented Nov. 8, 1949

2,487,076

UNITED STATES PATENT OFFICE 2,487,076

PROCESS FOR PRODUCING ALUMINA

Franklin H. Sharp and Clement C. March, Pullman, Wash.

Application December 2, 1944, Serial No. 566,370

5 Claims. (Cl. 204—104)

The present invention relates to a process for producing alumina from its natural sources, such as clays, particularly kaolin, and is directed to certain new and useful improvements whereby crystalline hydrated alumina is chemically precipitated from an aluminate obtained by alkali conversion of the solution obtained by dilute acid leaching of the calcined clay. This chemical precipitation of the hydrated alumina in crystalline form, enables it to be readily separated from the remaining liquid which can then be subjected to electrolysis so as to reconvert it into the acid and alkali used for leaching and aluminate conversion.

The process is accomplished with a low heat requirement, which is of paramount importance in districts where low cost fuel is not available. In districts where aluminum reduction plants are usually situated because of low cost hydro-electric power, the regenerating of alkali and acid by electrolysis can be accomplished at feasible cost. Suitable high grade clay being available in the same districts where the aluminum reduction plant is situated, there is considerable saving in transportation which is now necessary because the bauxite source of alumina is far remote from such districts.

The invention is illustrated in the accompanying drawing which shows a flow sheet with appropriate legends and chemical formula, so as to afford a comprehensive understanding of the following detailed description.

With reference to the drawing, the clay which is preferably a suitable grade of kaolin, is first calcined, preferably at a temperature of 700–800° C. Any suitable mode of calcination may be employed. The time interval need be no more than required for the heat to fully penetrate the particles and raise the mass to the required temperature. The B. t. u. contained in the calcined material can be utilized for supplying heat to the leaching stage which should be held at approximately 90° C. Calcination in slabs or briquettes is desirable if leaching is done by percolation through vertical towers. Where agitators are used for leaching, a granular calcine is preferable. Whatever form of calcination is employed, the aluminum silicate is dissociated into silica and alumina, so as to afford a higher yield of the latter by leaching.

The leaching is preferably by dilute sulfuric acid ranging from 10 to 20 percent $H_2SO_4$ as that strength can quite readily be regenerated by electrolysis.

As shown by the flow sheet, the leaching is by counter-current recirculation in two stages, an excess of sulfuric acid being added to the second stage to assure complete leaching before the insoluble waste solids are filtered out and the liquid portion then returned to the first stage where the last traces of $H_2SO_4$ are consumed so as to produce a neutral aluminum sulfate solution having a pH of about 3.5. The solids from the first stage are separated out in any suitable manner such as by use of a thickener device, and these solids are fed to the second stage for further leaching, while the clear solution of aluminum sulfate $Al_2(SO_4)_3$ is fed into an agitator to be converted to an aluminate.

This counter-current leaching can readily be accomplished in two series of agitators, with two or three agitators in each series, a suitable thickener device and a filter being connected between the two series as shown in the flow sheet. Where percolation leaching is employed, the final clarification of the leach solution will suffice without any filtering between stages.

Counter-current leaching of some form is desirable to assure maximum yield from the raw material, but a single series leach will suffice if the quantity of sulfuric acid is controlled so as to assure a leach solution of neutral aluminum sulfate without discarding too much alumina in the waste solids. Proper control of the pH value of the final agitator in a single series will minimize the unrecovered alumina.

The solution of neutral aluminum sulfate from the leaching, is fed to an agitator into which a solution of sodium hydroxide is constantly fed to convert the aluminate sulfate to a solution of sodium aluminate containing the resulting sodium sulfate. The conversion first forms flocks of aluminum hydroxide and some form of agitator is necessary to break up these flocks as fast as they form so as to facilitate conversion to sodium aluminate. A pH value between 11.2 and 11.5 assures complete conversion, during which the sodium hydroxide also precipitates out the impurities as insolubles. All of the iron is precipitated as iron hydroxide which may be either ferrous or else ferric, and all of the titanium is precipitated as titanium hydrate. About 90% of the dissolved silica is also precipitated. The remaining trace of dissolved silica can be precipitated by heating the aluminate solution in an autoclave, but it is preferable to precipitate this dissolved silica by the addition of a calcium ion such as calcium sulfite or calcium sulfide added before the first agitator of the conversion to sodium aluminate.

The precipitated impurities are then filtered out, and the clear aluminate solution is fed to a series of agitators where dilute sulfuric acid is gradually added to precipitate hydrated alumina in crystalline form. The precipitation begins at a pH value of about 10.8 and the alkalinity holds at that point until precipitation is complete, after which it is desirable to further add sulfuric acid to afford a pH value of 7.0 as a neutral solution is preferable for subsequent electrolysis. The time interval for precipitating the alumina should be prolonged for sufficient period to afford a crystal growth of a size suitable to meet the requirements of an aluminum reduction plant, as that is the prime purpose of the present invention. Furthermore, a gelatinous precipitate of alumina is exceedingly difficult to separate from the sodium sulfate solution which according to the present invention is solely subjected to electrolysis so as to avoid any solid phase during the electrolysis. The slow precipitation of the present invention is of paramount importance and is the very criterion of the invention.

The crystaline hydrated alumina $Al_2O_3 \cdot 3H_2O$ is filtered out, then washed with hot water to remove any sodium sulfate and again filtered to separate the hydrated alumina, which is then calcined to anhydrous alumina $Al_2O_3$ the calcination being preferably at a temperature above 1000° C. The wash water from the final filter can be utilized to wash the original waste solids so as to recover the reagents absorbed therein, whereupon the latter can be fed back into the counter-current leach circuit, to whatever extent will suffice to maintain a constant volume. This will recover most of the aluminum sulfate and sulfuric acid which otherwise wets these solids when they are originally filtered out.

The neutral sodium sulfate solution which is filtered out from the precipitated hydrated alumina is subjected to electrolysis so as to regenerate the sulfuric acid and sodium hydroxide used in the described process. This electrolysis can readily be accomplished in a series of diaphragm electrolytic cells, by counter-current circulation; the several anode compartments being connected together so as to afford a continuous flow from one end to the other of the entire series, and the several cathode compartments being connected together in like manner so as to afford continuous flow in the opposite direction. In this manner, the highest concentration of sodium hydroxide occurs on the opposite side of the diaphragm where the lowest percentage of sulfuric acid is on the opposite side, and vice versa. This minimizes neutralization through the diaphragms and thus avoids a decrease in power efficiency. It is possible to conduct the electrolysis by this counter-current circulation of the anolyte and catholyte, at a current efficiency of about 85 percent, using a current density of 100 amperes per square foot at from 3.5 to 4 volts, which affords a recovery of the sodium hydroxide and sulfuric acid to the extent of about 4.0 equivalents each per liter, leaving sodium sulfate about .8 equivalents per liter to be recirculated through the process as that is of no disadvantage, and a higher electrolytic conversion would result in lower efficiency of power consumed. Electrolysis of the water also occurs, and the resulting hydrogen can readily be used as fuel for final calcining of the alumina. This hydrogen is particularly suitable for the purpose as it is dust free and also there is no contaminating product of combustion. If desired, the resulting oxygen can also be used to enhance the combustion.

This recovery of the reagents used is of paramount importance for economic practicability. Any unavoidable loss of the reagents can be replenished by sodium sulfate which is readily obtainable at sufficiently low price to make it preferred; or else, if low grade sulfuric acid is readily obtainable nearby, it may be employed, and also the sodium hydroxide replenished. There are known smelters which produce dilute sulfuric acid as a by-product in enormous quantities, and the present process could readily be operated by such smelters as a convenient mode of utilizing that waste sulfuric acid which is otherwise quite a problem to discard, and of no real commercial value.

It will be seen that the disclosed process can readily be controlled in its various steps and made continuous. There is no necessity for evaporation of solutions, and thus there is conservation of fuel which is a major factor of cost in various other processes for producing alumina. It will also be seen that in the present invention, the separation of the alumina is accomplished entirely independent of the recovery of the reagents, and there is the particular advantage that the alumina can be produced in a crystal size to meet the requirements of aluminum reduction plants. All of these factors are of paramount importance to economic practicability, and the present disclosure presents the best mode that we have been able to devise.

The process is disclosed as a sulfuric acid leach with conversion to an aluminate, but it will be readily seen that the steps following thereafter can also be practiced to advantage in any process which affords either neutral aluminum sulfate or else an aluminate solution, irrespective of the preliminary steps employed to arrive at those products or the source from which they are derived. Those skilled in the art will also understand that any process which affords insoluble basic aluminum sulfate can readily be converted into a solution of neutral aluminum sulfate by well known means, after which the remaining steps of the present invention can be used to advantage.

As here disclosed, sodium hydroxide has been used for the alkali conversion step, but it will be understood that potassium hydroxide can be used instead and with equal advantage, sodium hydroxide being disclosed because of the greater availability of sodium sulfate for regenerating the sodium hydroxide.

In the present disclosure we claim as our invention:

1. A process for producing alumina from calcined kaolin, which comprises generating a sodium hydroxide solution and sulfuric acid of at least ten per cent by electrolysis of a sodium sulfate solution, leaching said calcined kaolin with said sulfuric acid by counter-current recirculation in two stages wherein said sulfuric acid is added to the second stage and the last traces thereof are consumed in the first stage to produce a solution of aluminum sulfate having a pH of about 3.5, separating the solids from said solution of aluminum sulfate, gradually adding said sodium hydroxide solution to form a sodium aluminate solution having a pH of about 11.5, separating the insolubles therefrom, gradually adding said sulfuric acid to reduce the aluminate solution to a pH value of about 10.8 at which point precipitation of hydrated alumina begins, continuing the gradual addition of said sulfuric acid as long as the pH value holds at 10.8, whereby the time element enables crystals of hydrated alumina to grow in size thereby regulating the size of crystals in accordance with the rate of precipitation, separating said crystals from the resulting sodium sulfate solution, washing said crystals with water, calcining the washed crystals to finally produce anhydrous alumina, and recycling said sodium sulfate solution as the electrolyte for generating said sodium hydroxide solution and said sulfuric acid of at least ten per cent.

2. A process for producing alumina from calcined kaolin, which comprises generating a sodium hydroxide solution and sulfuric acid of at least ten per cent by electrolysis of a sodium sulfate solution, leaching said calcined kaolin with said sulfuric acid to produce a solution of aluminum sulfate having a pH of about 3.5, separating the solids from said solution of aluminum sulfate, gradually adding said sodium hydroxide solution to form a sodium aluminate solution having a pH of about 11.5, separating the insolubles therefrom, gradually adding said sulfuric acid to reduce the aluminate solution to a pH value of about 10.8 at which point precipitation of hydrated alumina begins, continuing the gradual addition of said sulfuric acid as long as the pH value holds at 10.8, whereby the time element enables crystals of hydrated alumina to grow in size thereby regulating the size of crystals in accordance with the rate of precipitation, separating said crystals from the resulting sodium sulfate solution, washing said crystals with water, calcining the washed crystals to finally produce anhydrous alumina, and recycling said sodium sulfate solution as the electrolyte for generating said sodium hydroxide solution and said sulfuric acid of at least ten per cent.

3. A process for producing alumina from calcined kaolin, which comprises generating a sodium hydroxide solution and sulfuric acid of at least ten per cent by counter-current electrolysis employing sodium sulfate solution as the anolyte and the catholyte flowing in opposite directions in adjacent paths, leaching said calcined kaolin with said sulfuric acid to produce a solution of neutral aluminum sulfate having a pH of about 3.5, separating the solids from said solution of neutral aluminum sulfate, gradually adding said sodium hydroxide solution to form a sodium aluminate solution having a pH of about 11.5, separating the insolubles therefrom, gradually adding said sulfuric acid to reduce the aluminate solution to a pH value of about 10.8 at which point precipitation of hydrated alumina begins, continuing the gradual addition of said sulfuric acid as long as the pH value holds at 10.8, whereby the time element enables crystals of hydrated alumina to grow in size thereby regulating the size of crystals in accordance with the rate of precipitation, separating said crystals from the resulting sodium sulfate solution, washing said crystals with water, calcining the washed crystals to finally produce anhydrous alumina, and recycling said sodium sulfate solution as the electrolyte for generating said sodium hydroxide solution and said sulfuric acid of at least ten per cent.

4. A process for producing alumina, comprising leaching a calcined source with sulfuric acid to form a solution of aluminum sulfate having a pH of about 3.5, separating the solids from said aluminum sulfate solution, gradually adding sodium hydroxide solution to form a sodium aluminate solution having a pH of about 11.5, separating the insolubles therefrom, gradually adding sulfuric acid to reduce the aluminate solution to a pH value of about 10.8 at which point precipitation of hydrated alumina begins, continuing the gradual addition of sulfuric acid as long as the pH value holds at 10.8, whereby the time element enables crystals of hydrated alumina to grow in size thereby regulating the size of crystals in accordance with the rate of precipitation, separating said crystals from the resulting sodium sulfate solution, washing said crystals with water, calcining the washed crystals to finally produce anhydrous alumina, and subjecting said sodium sulfate solution to electrolysis sufficient to generate sulfuric acid of at least ten per cent for utilization in said leaching step.

5. In a process for producing alumina wherein a calcined source is leached with sulfuric acid of at least ten per sent to form a solution of aluminum sulfate to which is added sufficient alkali hydroxide to form an alkali aluminate solution to which sulfuric acid is added to precipitate hydrated alumina and form a solution of alkali sulfate, the improvement which consists of subjecting said solution of alkali sulfate to a series of electrolysis steps in which said solution of alkali sulfate is the anolyte and flows from one end of the series to the other and is also the catholyte and flows counter-current from one end of the series to the other, said series of electrolysis steps being sufficient to produce sulfuric acid of at least ten per cent for leaching in the first said step.

FRANKLIN H. SHARP.
CLEMENT C. MARCH.

REFERENCES CITED

The following references are of record in the file of this patent:

UNITED STATES PATENTS

| Number | Name | Date |
| --- | --- | --- |
| 234,704 | Bihn | Nov. 22, 1880 |
| 1,397,562 | Thatcher | Nov. 22, 1921 |
| 1,840,105 | Kean | Jan. 5, 1932 |
| 2,082,526 | Stohr et al. | June 1, 1937 |
| 2,120,840 | McCullough | June 14, 1938 |

OTHER REFERENCES

Vol'f et al.: Chemical Abstracts, volume 30, page 6141 (1936).